United States Patent

[11] 3,591,238

| | | | |
|---|---|---|---|
| [72] | Inventor | Paul E. Titus | |
| | | Houston, Tex. | |
| [21] | Appl. No. | 802,613 | |
| [22] | Filed | Feb. 26, 1969 | |
| [45] | Patented | July 6, 1971 | |
| [73] | Assignee | Shell Oil Company | |
| | | New York, N.Y. | |

[54] MULTIDIAMETER PIPELINE ARRANGEMENT FOR FACILITATING RESUSPENSION OF SETTLED SLURRY SOLIDS
4 Claims, 2 Drawing Figs.

[52] U.S. Cl. ................................................... 302/14, 302/64, 302/66
[51] Int. Cl. ........................................................B65g 53/30, B65g 53/52
[50] Field of Search ........................................ 302/64, 14, 66; 138/120, 155; 285/302, 305, 165, 163

[56] References Cited
UNITED STATES PATENTS

| | | | |
|---|---|---|---|
| 259,457 | 6/1882 | Armington .................. | 285/302 X |
| 381,008 | 4/1888 | Gould.......................... | 285/302 X |
| 404,780 | 6/1889 | Dowd .......................... | 285/302 X |
| 534,430 | 2/1895 | Emerson ..................... | 285/302 X |
| 955,952 | 4/1910 | East............................. | 285/165 X |
| 1,019,000 | 2/1912 | Watson ....................... | 285/305 |
| 1,859,449 | 5/1932 | MacKenzie.................. | 285/305 X |
| 2,261,347 | 11/1941 | Santo et al................... | 302/64 |
| 2,391,484 | 12/1945 | Seymour ..................... | 302/64 X |
| 2,834,059 | 5/1958 | Hoelzel ....................... | 302/64 X |
| 2,900,028 | 8/1959 | Hanes.......................... | 285/302 X |

FOREIGN PATENTS

| | | | |
|---|---|---|---|
| 951,617 | 3/1964 | Great Britain................ | 138/155 |

*Primary Examiner*—Evon C. Blunk
*Assistant Examiner*—W. Scott Carson
*Attorneys*—Thomas R. Lampe and J. H. McCarthy

ABSTRACT: Method and apparatus for facilitating resuspension of a slurry material solid phase in a shut-down slurry pipeline upon restart. The internal diameter is progressively increased in the direction of slurry flow in those portions of the pipeline where plug formation by settled slurry solids during pipeline shutdown is likely to occur.

PATENTED JUL 6 1971

3,591,238

INVENTOR:
P. E. TITUS
BY: *Thomas R Lampe*
HIS ATTORNEY

MULTIDIAMETER PIPELINE ARRANGEMENT FOR FACILITATING RESUSPENSION OF SETTLED SLURRY SOLIDS

The present invention relates to pipeline transport operations; and more particularly, to a method and apparatus for facilitating resuspension of settled slurry solids in a pipeline upon pipeline restart.

Transportation by pipeline is a major and growing industry. With the use thereof formerly confined almost entirely to movement of water, gas and petroleum products, pipelines, with the advent of slurry transport, have become useful for long and short hauls of a wide variety of raw materials and finished products.

With respect to the pipeline transportation of materials in slurry form, problems arise when such materials are moved through pipelines inclined to go over a hill or down into a valley. At these locations, during a planned or emergency line shutdown, the solids of the transported slurry may settle out vertically and subsequently slide down the inclined portions of the pipeline, thereby causing a compacted plug which may be very difficult to dislodge and move when line shutdown is terminated and transport activities are resumed.

These difficulties are most commonly avoided by laying solids-carrying or slurry pipelines so that they do not exceed a slope or angle of inclination below which sliding does not occurs. Alternatively, the inclined pipeline sections are emptied at each shutdown. Obviously, these alternative prior art approaches are not always feasible or economical, especially in those situations where long and relatively steep slopes are encountered. Slopes of this nature are being encountered with increasing frequency as pipeline operations are being extended to new relatively inaccessible mountainous areas in the United States and elsewhere.

SUMMARY OF THE INVENTION

It is therefore a primary object of the present invention to provide an improved and economical apparatus and method whereby the settled solid phase of a slurry material being transported in a pipeline is readily mixed with the remainder of the slurry material upon pipeline restart.

This and other objects have been attained in the present invention by providing a method and apparatus for facilitating the resuspension of settled solids in a shutdown slurry pipeline wherein the pipeline diameter is increased in the normal direction of slurry flow in those locations where plug formation may occur. This approach, which may be carried out by either tapering the pipeline or enlarging the diameter thereof at predetermined lengths, permits the mass of divided solids defining a plug to expand laterally upon pipeline restart whereby the solids are readily resuspended.

DESCRIPTION OF THE DRAWING

The above-noted and other objects of the present invention will be understood from the following description, taken with reference to the accompanying drawing. In describing the invention in detail, reference will be made to the drawing in which like reference numerals designate corresponding parts throughout several views in which:

Referring now to FIG. 1, a given length of slurry pipeline 11 is illustrated in the position assumed thereby as the pipeline proceeds to and from a valley formed between two hills or mountains 12 and 13. The terrain illustrated is typical of that encountered in pipeline laying activities, although it should be understood that the teachings of the present invention may be carried out in any topographical configuration wherein a portion of slurry pipeline is inclined.

Figure 1:
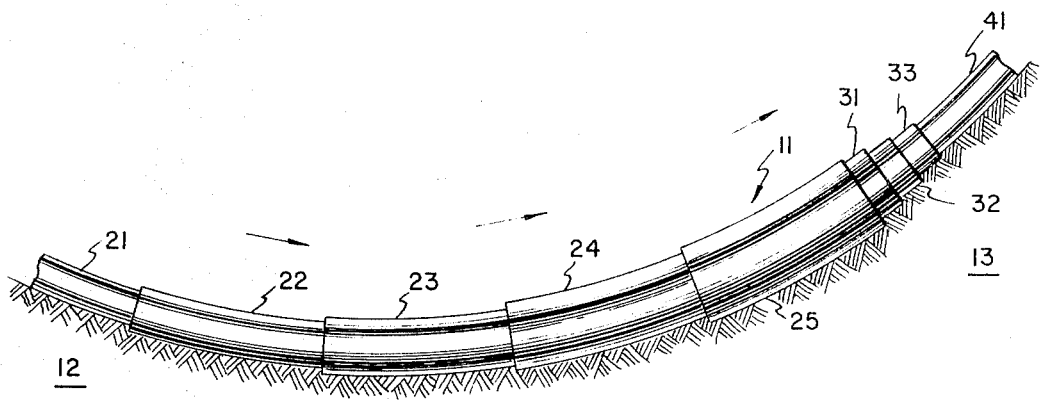
FIG. 1 is a diagrammatic view illustrating a given length of slurry pipeline which has been modified in accordance with the teachings of the present invention.

The transportation of slurries consisting of solid particles in a fluid medium by use of pipelines similar to that disclosed in FIG. 1 is quite well known, and such expedient is finding increasing use, especially in those situations where the source of raw materials is relatively remote and inaccessible from the point of delivery, which may be suitable processing plant, for example. In the disclosed arrangement, it may be assumed for purposes of illustration that the slurry material being transferred through pipeline 11 as by means of conventional pumps (not shown) is moving through the line in the direction indicated by the arrows. However, the teachings of the present invention are, of course, applicable regardless of the direction of flow of the slurry.

As long as flow continues in the pipeline, the solid matter of the slurry will remain in suspension within the pumped liquid, even when the solid matter has a higher specific gravity than the liquid. If, however, the flow is stopped for any reason, i.e., the pipeline is shut down, such solid matter will settle out of suspension. In the situation where the line is horizontal or the slope of the line is insufficient to cause sliding of the settled solids, no problem is created by such settling out. Under these conditions, a liquid-rich channel remains open at the top of the line which allows the settled material to be resuspended with a minimum of difficulty upon resumption of slurry flow.

A serious problem can exist when the pipeline must be inclined to go over a hill or down a valley, as illustrated, for example, in FIG. 1. At these locations, the settling of solids followed by their sliding down the slope during a protracted shutdown can result in a compacted plug of material difficult, if not impossible, to move or resuspend. In the illustrated pipeline configuration, such solids would slide downwardly into the valley formed between hills or mountains 12 and 13. The solid material would then compress under its own weight to form a plug in the valley in an obvious manner.

Figure 2:
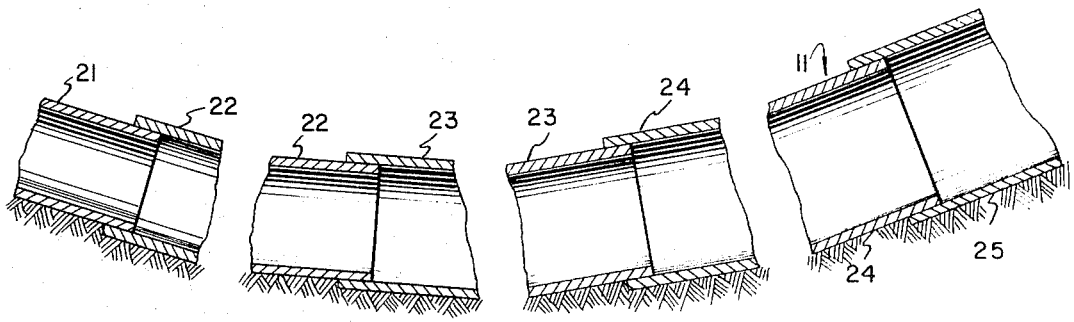
FIG. 2 is an enlarged cross-sectional view in longitudinal projection illustrating selected segments of the pipeline section of FIG. 1.

Such plug formation is prevented in accordance with the teachings of the present invention as follows. As the pipeline proceeds into the valley it is constructed of pipe sections of increasing internal diameter in the direction of slurry transport. That portion of pipeline 11 shown in FIG. 1 as lying along hill 12 and indicated by means of reference numeral 21 is to be understood as having an inner diameter utilized in the sections of the pipeline where compacting or plugging by slumped slurry solids upon shutdown is not likely to occur. Near the bottom of hill 12, however, such plugging is likely to occur and portion 21 of pipeline 11 is attached to and in communication with a length of pipeline 22 having an inner diameter somewhat greater than the inner diameter of pipeline portion 21. Length of pipeline 22 is in turn connected in communication at the other end thereof to a given length of pipe 23 having an inner diameter greater than the inner diameter of pipeline length 22. Similarly, length of pipe 23 is connected to length of pipe 24 and length of pipe 24 to length of pipe 25 with each succeeding length of pipe defining an interior having a greater inner diameter than the preceding and adjacent length of pipe. The number and length of the lengths of pipe employed in the above-described multi diameter pipeline arrangement will depend upon the requirements of a given situation as determined, for example, by the quality and quantity of solid slurry material which will slump and compact in the pipeline at a given location. Likewise, any desired method of interconnecting the lengths of pipe may be employed. In FIG. 2, for example, the internal diameters of succeeding lengths of pipe are shown as being slightly greater than the outer diameters of the adjacent lengths of pipe lying upstream therefrom. In this manner the larger-diameter lengths of pipe may be slid over the preceding adjacent smaller-diameter lengths of pipe and secured thereto as by means of welding. Alternatively, ordinary screw threads may be employed for this purpose.

Assuming now that normal slurry transport has terminated for some reason and slumping and compacting of the slurry material solid phase has occurred in the area of the above-described multidiameter pipeline arrangement restart of the pipeline and resuspension of the solid matter will be facilitated as follows. Tests with plugged lines have indicated that a mass of finely divided solids, when pushed longitudinally in a pipe, ten to expand laterally, thus causing a self-tightening plug that can be very difficult to dislodge. According to the teachings of the present invention, however, upon pipeline restart the mass of slurry material solids which has formed along the low points of the pipe will move into successively larger diameter lengths of pipe, thereby preventing formation of an even denser plug in the line. In addition, as the slurry moves into a section of larger diameter, participle-pipeline wall friction tends to be reduced, thus further facilitating movement.

At a preselected location up hill 13 a series of cooperating couplers or adapter pipes 31, 32 and 33 of varying diameters are utilized in an obvious manner to bring pipeline 11 down to the diameter utilized over the vast majority of the length of the pipeline where plug formation is not likely to occur. A portion of the standard diameter pipeline 11 is designated by means of reference numeral 41 and is of the same diameter as pipeline portion 21. The point at which the pipeline diameter is reduced to its normal value is, of course, somewhat a matter of choice. However, such point should be chosen sufficiently far up the uphill slope to ensure that a plug formed in the valley has been sufficiently broken up and the constituent solid material resuspended during pipeline restart. Couplers or adapter pipes 31, 32 and 33 may be joined in any desired manner, as by means of welding, screw threads, etc.

I claim as my invention:

1. Apparatus for facilitating resuspension of a slurry material solid phase in a shutdown slurry pipeline upon restart, said pipeline having at least one portion thereof inclined to the horizontal, said inclined portion having a substantially uniform internal diameter along a substantial portion of said inclined portion, said pipeline further having at least a lowermost portion in fluid communication with said inclined portion where plug formation is likely to occur due to slumping and compacting of said solid phase under the influence of gravity when pipeline flow has terminated, said apparatus comprising:

a plurality of pipeline segments joined together in an end-to-end manner in those portions of said pipeline where plug formation is likely to occur due to slumping an compacting of the slurry material solid phase under the influence of gravity when pipeline flow has terminated; and said pipeline segments defining inner diameters progressively increasing in size from said substantially uniform internal diameter comprising said inclined portion in the direction of slurry flow whereby compacted slurry solid phase material in the pipeline will flow laterally outwardly with respect to the central longitudinal axis of said segments and within said segments thereby reducing friction between the solid phase material and the pipeline wall upon pipeline restart by breaking up therein.

2. The apparatus according to claim 1 wherein said pipeline segments comprise a plurality of lengths of pipe of different internal and external diameters with the internal diameter of each segment being greater than the external diameter of the adjacent upstream pipeline segment.

3. The apparatus according to claim 2 wherein adjacent segments of pipeline are secured together in overlapping relationship.

4. A method for facilitating resuspension of a slurry material solid phase in a shutdown slurry pipeline upon restart, said pipeline having at least one portion thereof inclined to the horizontal, said inclined portion having a substantially uniform internal diameter along a substantial portion of said inclined portion, said pipeline further having at least a lowermost portion in fluid communication with said inclined portion where plug formation is likely to occur due to slumping and compacting of said solid phase under the influence of gravity when pipeline flow has terminated, said method comprising the steps of;

flowing said slurry material in a substantially unobstructed stream from said inclined portion through said lowermost portion; and progressively increasing the cross-sectional area of said flowing stream of slurry with respect to the cross-sectional area of said stream in said inclined portion along a substantial portion of said lowermost portion where plug formation is likely to occur due to slumping and compacting of the slurry material solid phase under the influence of gravity when pipeline flow has been terminated.